United States Patent [19]

Bergman

[11] Patent Number: 4,866,704
[45] Date of Patent: Sep. 12, 1989

[54] FIBER OPTIC VOICE/DATA NETWORK

[75] Inventor: Larry A. Bergman, Van Nuys, Calif.

[73] Assignee: California Institute of Technology, Pasadena, Calif.

[21] Appl. No.: 168,663

[22] Filed: Mar. 16, 1988

[51] Int. Cl.$^4$ .............................................. H04J 3/02
[52] U.S. Cl. ................................ 370/85.4; 370/110.1; 370/4; 370/85.5; 370/94.1
[58] Field of Search ................ 370/85, 86, 88, 89, 370/94, 110.1; 340/825.5, 825.05; 455/606, 607

[56] References Cited

U.S. PATENT DOCUMENTS

| | | | |
|---|---|---|---|
| 4,438,520 | 3/1984 | Saitzel | 370/89 |
| 4,706,246 | 11/1987 | Kuane | 370/89 |
| 4,790,918 | 12/1987 | Miyao | 370/85 |

*Primary Examiner*—Douglas W. Olms
*Assistant Examiner*—Frank M. Scutch, III
*Attorney, Agent, or Firm*—Donald A. Streck; Edward O. Ansell

[57] ABSTRACT

An asynchronous, high-speed, fiber optic local area network originally developed for tactical environments with additional benefits for other environments such as spacecraft, and the like. The network supports ordinary data packet traffic simultaneously with synchronous T1 voice traffic over a common token ring channel; however, the techniques and apparatus of this invention can be applied to any deterministic class of packet data networks, including multitier backbones, that must transport stream data (e.g., video, SAR, sensors) as well as data. A voice interface module parses, buffers, and resynchronizes the voice data to the packet network employing elastic buffers on both the sending and receiving ends. Voice call setup and switching functions are performed external to the network with ordinary PABX equipment. Clock information is passed across network boundaries in a token passing ring by preceeding the token with an idle period of non-transmission which allows the token to be used to re-establish a clock synchronized to the data. Provision is made to monitor and compensate the elastic receiving buffers so as to prevent them from overflowing or going empty.

17 Claims, 12 Drawing Sheets

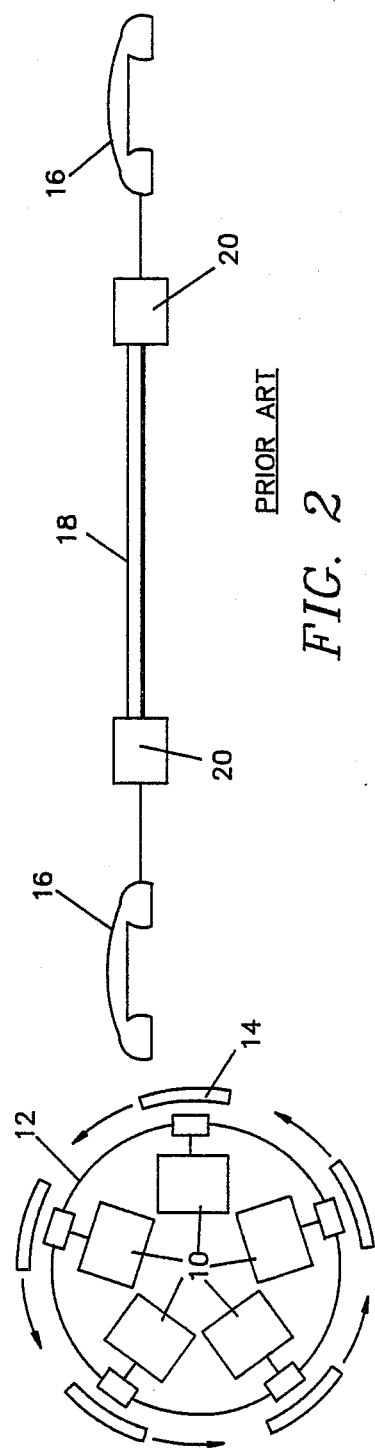
FIG. 1 PRIOR ART
FIG. 2 PRIOR ART
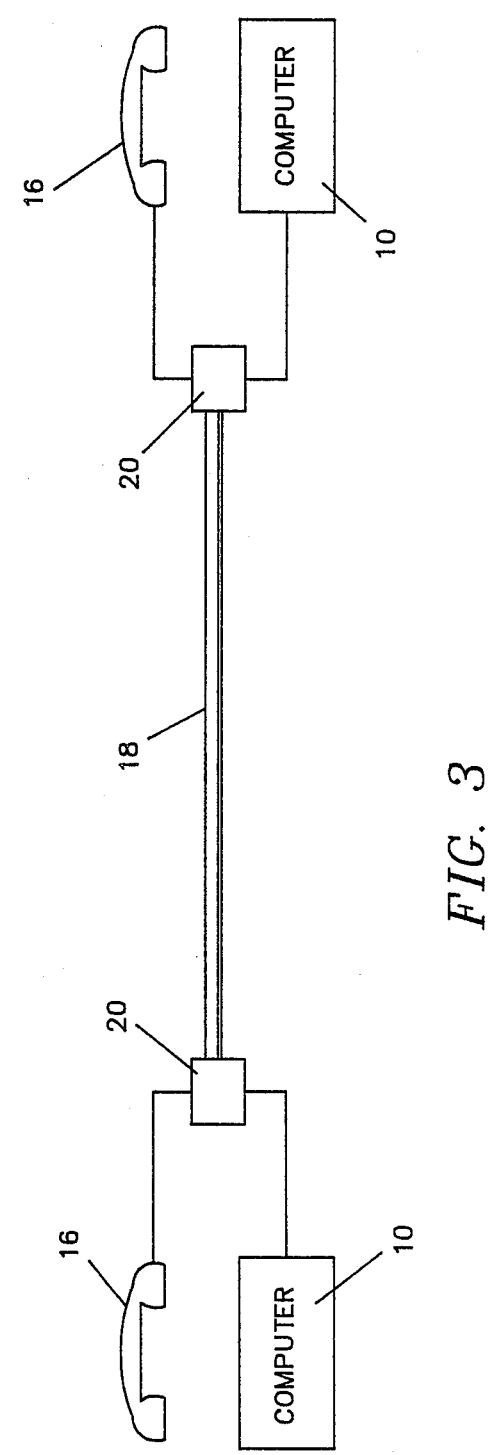
FIG. 3

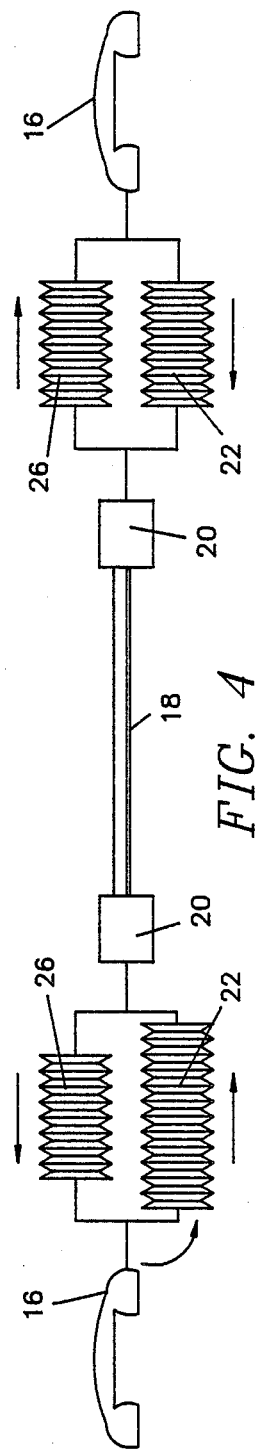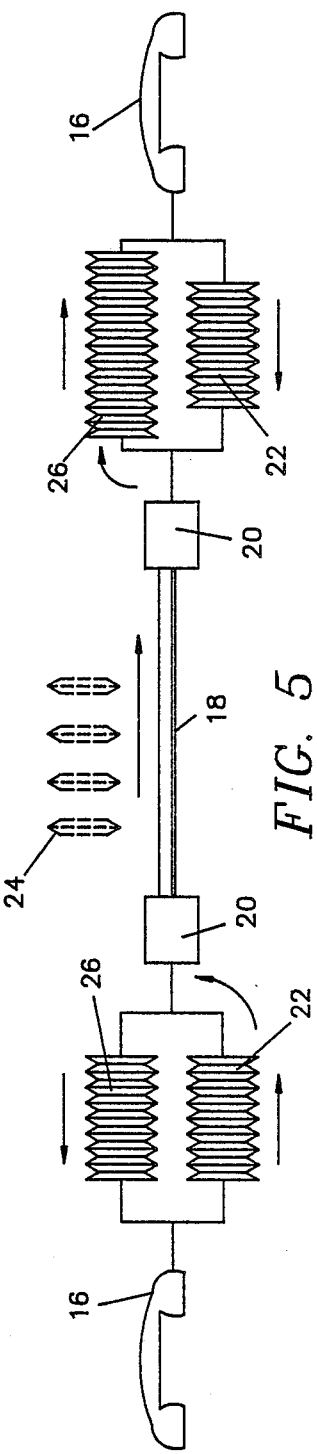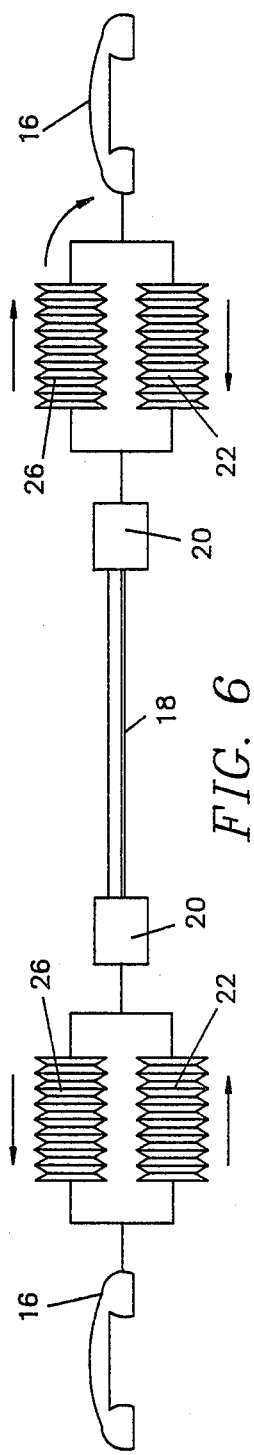

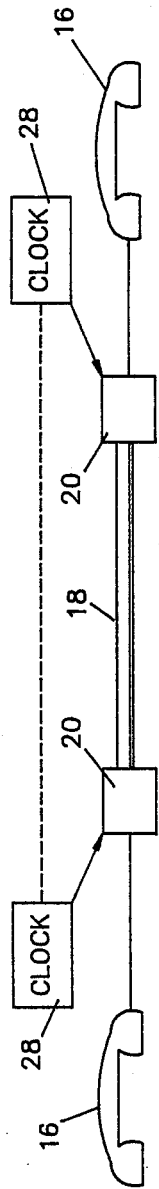
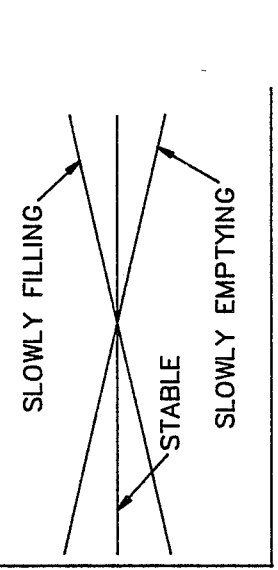
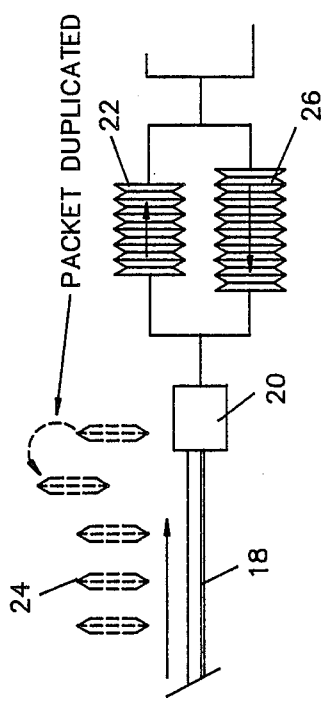
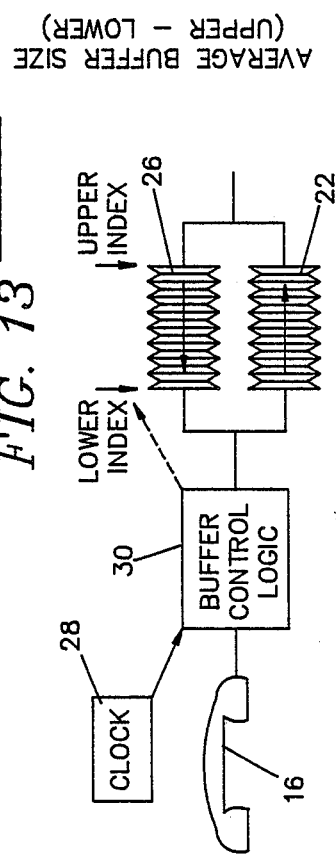
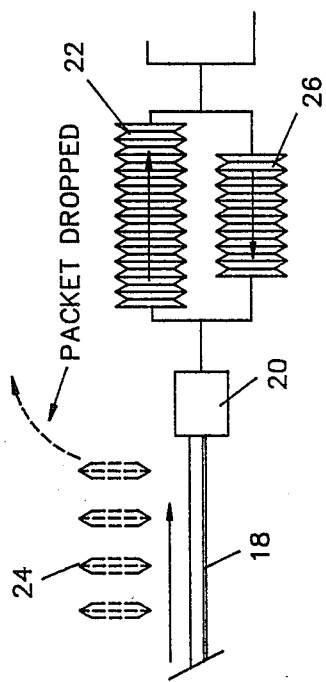

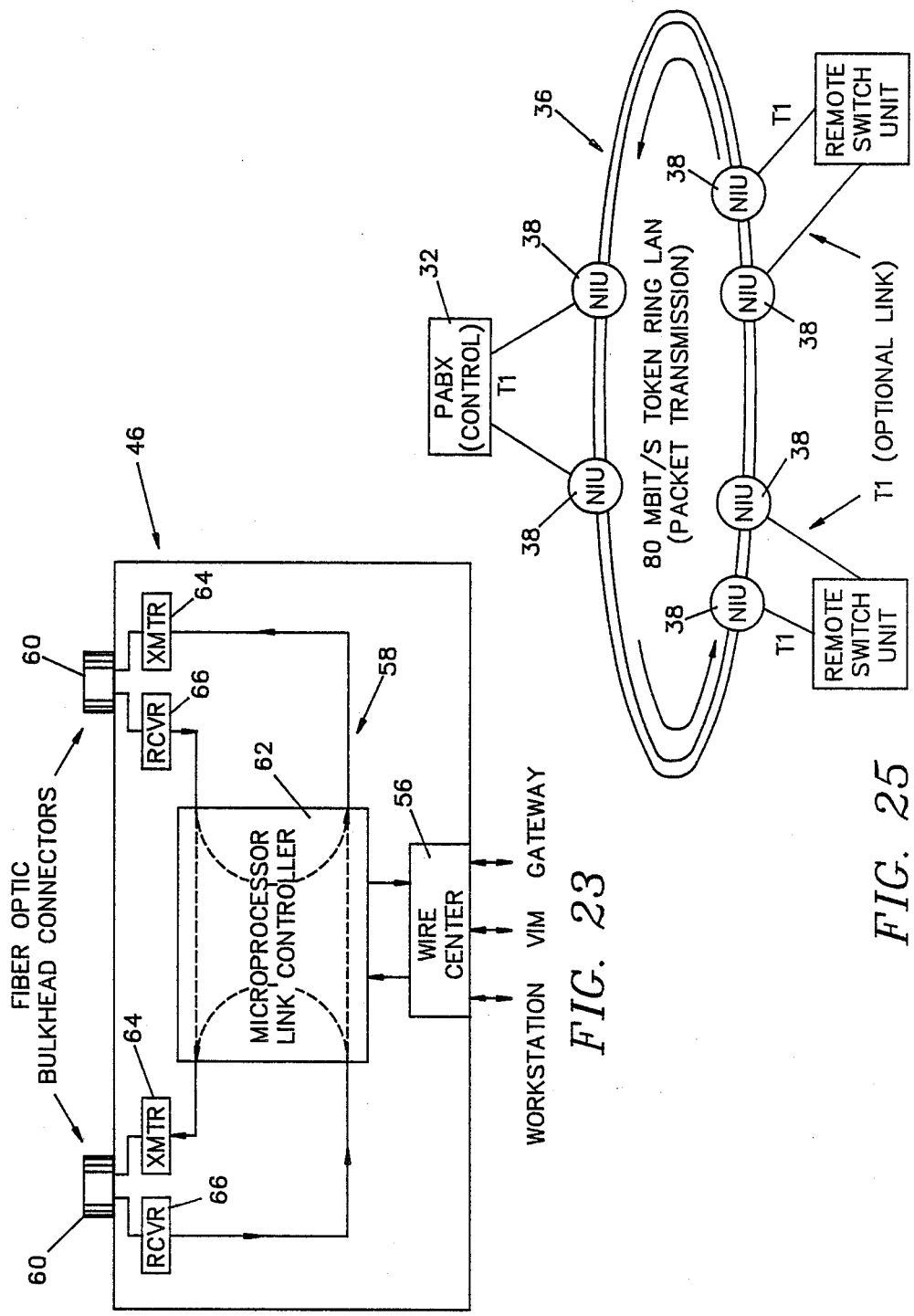

FIBER OPTIC VOICE/DATA NETWORK

ORIGIN OF THE INVENTION

The invention described herein was made in the performance of work under a NASA contract, and is subject to the provisions of Public Law 96-517 (35 USC 202) in which the Contractor has elected to retain title.

BACKGROUND OF THE INVENTION

The present invention relates to communications network and local area networks and, more particularly, to the method and associated apparatus for operating a local area communications network so as to permit a plurality of nodes to transmit and receive voice, video, and other forms of real-time traffic between one another along with normal computer communications according to the method comprising the steps of, disposing a communications medium along a path between the nodes; employing a plurality of interfacing units to operably connect respective ones of the nodes to the communications medium; inputting real-time communications traffic from a transmitting node into an elastic FIFO transmitting buffer; removing stored traffic from the transmitting buffer in fixed length packets and transmitting the packets sequentially onto the communications medium; inputting the packets sequentially from the communications medium into an elastic FIFO receiving buffer at a receiving node; and, removing the packets from the receiving buffer and transmitting them to the associated receiving node in contiguous form to reconstruct the original real-time transmission. More specifically, the communications medium is a token passing ring where a token bit sequence is transmitted along a ring communications medium to indicate the point where a packet can be placed onto the ring and the method additionally including the steps of, at each transmitting node, preceeding each token bit sequence with an idle period of non-transmission; and, at each receiving node, sensing the idle period and using the bits of the token bit sequence to establish and synchronize to the clock of the packet following thereafter whereby clock information relative to the packets is conveyed across boundaries of the network. Additionally, the preferred method includes the steps of, monitoring the average size of the receiving buffer; slowing the filling of the receiving buffer when the average size is increasing; and, increasing the filling of the receiving buffer when the average size is decreasing whereby the average size is maintained in a stable state and the receiving buffer is prevented from being totally emptied or from overflowing.

Network communication systems have gained great popularity recently because of the many advantages they offer. For example, as shown in simplified form in FIG. 1, it is common to have a plurality of computers 10 interconnected by a communications network 12 over which messages 14 can be passed from computer to computer. Fiber optics is another fairly recent technological achievement that has gained rapid acceptance for its benefits—particularly in voice quality communications where a quiet communications channel free from electromagnetic interference (EMI), and the like, (which normally accompany wire systems) is desired or required. In the typical voice fiber optic communications system as depicted in FIG. 2, the telephone 16 (or modem, etc.) on each end is connected to the fiber optic bundle 18 by bi-directional coupling devices 20 which turn an electrical signal from the telephone 16 into a light signal for transmission over the fiber optic bundle 18 and back to an electrical signal at the opposite end. Typical voice communication is continuous as opposed to the discrete messages 14 of the computer network of FIG. 1; that is, once a connection has been established between the two telephones 16, it is available and open for communication—whether or not any actual communication is taking place. Thus, if one wishes to combine both computer message transmission and voice communications over a common communications channel as depicted in FIG. 3, the voice messages must be packetized, i.e. broken up into segments such as the computer messages 14 (with which they share the channel) which are then sent like any of the messages 14 and then "reconstructed" on the receiving end into a contiguous message stream. Such packetization of voice communications is known in the art and happens all the time in satellite communications systems.

The availability of low-cost high-capacity fiber optic communications has recently provided new impetus for practical integrated service data networks (ISDN), i.e. networks providing various communications on a single shared channel. Many different protocol strategies have been proposed over the past few years for combining data, voice, video, and other forms of real-time traffic onto one local area (10 km) network (LAN). These range from highly synchronous protocols dedicating isolated channels for the real-time service via TDM, slotted transmission frames, or Wavelength Division Multiplexing (WDM) to complex reservation bit schemes using a single common packet channel. Of the latter, deterministic protocols such as token rings, token buses, unidirectional buses, or modified CSMA/CD buses with deterministic contention resolution are suitable. Most real-time services, such as voice or video, require bandwidth significantly beyond the few Mbit/s capacity of most of these LANs, however, and furthermore, few of these protocols will provide high efficiency at higher data rates should technology permit further growth in the future. The proposed Fiber (Optic) Distributed Data Interface (FDDI) standard, which is based on a streamlined token ring protocol and optimized for 1.3-um fiber optic technology, however, is seen as one promising candidate for real-time networks. With 200 Mbit/s of capacity and a highly deterministic dual-counter-rotating token ring topology, FDDI possesses enough bandwidth to support up to 800 voice channels or perhaps 1-2 digitized video channels. One problem with transporting voice or video traffic over FDDI, however, is that the network and interface are asynchronous, thereby preventing timing information from passing across the network boundaries. While a synchronous version of FDDI may ultimately emerge, what is required at this time is an alternate method of transmitting synchronous voice traffic over an asynchronous packet switched FDDI—in effect creating a virtual T1 channel.

Wherefore, it is an object of the present invention to provide an alternate method of transmitting synchronous voice traffic over an asynchronous packet switched FDDI network based on double buffering real-time data at both the transmitting and receiving ends of the packet switched network to, in effect, create a virtual T1 channel.

It is another object of this invention to provide an alternate method of transmitting synchronous voice traffic over an asynchronous packet switched FDDI network wherein timing information is conveyed across the boundaries between the transmitting and receiving ends of the packet switched network.

Other objects and benefits of the present invention will become apparent from the description which follows hereinafter in conjunction with the drawing figures which accompany it.

STATEMENT OF THE INVENTION

This invention provides an asynchronous, high-speed, fiber optic local area network originally developed for tactical environments, such as military field communications system, but having additional specific benefits for other environments such as spacecraft, and the like. The network supports ordinary data packet traffic simultaneously with synchronous T1 voice traffic over a common token ring channel; however, the techniques and apparatus of this invention can be applied to any deterministic class of packet data networks, including multi-tier backbones, that must transport stream data (e.g., video, SAR, sensors) as well as data. A conventional single token access protocol is employed at the lowest layer, with fixed packet sizes for voice and variable for data. In addition, the higher layer packet data protocols are allowed to operate independently of those for the voice, thereby permitting great flexibility in reconfiguring the network. A novel voice interface module parses, buffers, and resynchronizes the voice data to the packet network employing elastic buffers on both the sending and receiving ends. Voice call setup and switching functions are performed external to the network with ordinary PABX equipment.

BRIEF DESCRIPTION OF THE DRAWINGS

FIG. 1 is a simplified drawing showing the prior art technique of employing a token ring network to pass message packets between a plurality of computers.

FIG. 2 is a simplified drawing showing the prior art use of fiber optic bundles to transmit voice communications.

FIG. 3 is a simplified drawing in the manner of FIG. 2 showing the environment of the present invention wherein fiber optic bundles operating as a network are use to transmit voice communications in combination with message packets being passed between a plurality of computers.

FIGS. 4-6 are simplified drawings showing the manner in which the present invention employs elastic buffers for incoming and outgoing voice communications to compensate for the differences in transmission times and the breaking up of the voice communications into packets for network transmission.

FIG. 13 is the simplified drawing FIG. 2 showing the use of fiber optic bundles to transmit voice communications and additionally showing how the clocks at the sending and receiving ends are in precise synchronization in that prior art approach.

FIG. 14 is a simplified functional block diagram showing how the buffer control logic in the present inventions includes indices into the FIFO elastic buffers employed therein indicating the point at which new data is to be added and from which old data is to be removed.

FIG. 15 is a graph depicting the various conditions possible with respect to the average buffer size over a period of time.

FIG. 16 is a simplified drawing showing how a packet can be dropped periodically, if necessary, to prevent the receiving buffer from going into an overflow condition.

FIG. 17 is a simplified drawing showing how a packet can be duplicated periodically, if necessary, to prevent the receiving buffer from going into an empty condition.

FIG. 23 is a functional block diagram of the media access box (MAB) of the present invention.

FIG. 24 is a simplified block diagram of PABX T1 link connection topology in the present invention.

FIG. 25 is a simplified block diagram of PABX T1 connection over the LAN in the present invention.

DETAILED DESCRIPTION OF THE INVENTION

Figure 7:
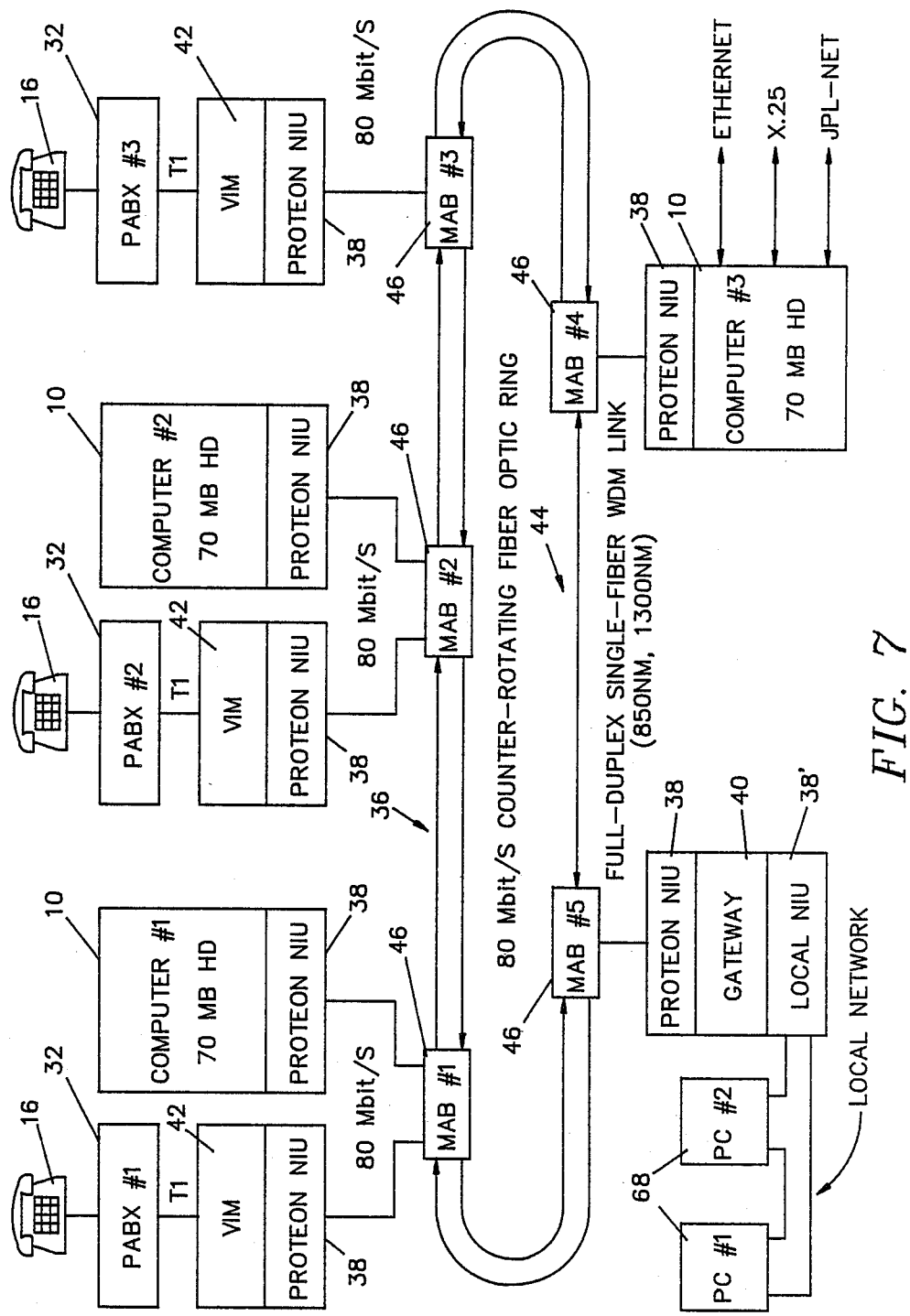
FIG. 7 is a block diagram of the testbed wherein the present invention was tested by the applicant.

The present invention is based on the proposition of employing an elastic buffer on both the transmitting and receiving ends to hold the packetized voice communications. Although the technique is amenable to any deterministic LAN, the best performance will be obtained with FDDI. Due to the unavailability of FDDI hardware, an initial proof-of-concept laboratory demonstration by the inventor had to employ a surrogate commercially available token ring running at 80 Mbit/s. Ultimately, it is envisioned that the testbed will be upgraded to meet the FDDI standard when commercial components become available.

The fiber optic components of the tested embodiment were based on 1.3-um technology, including 50/125-um multi-mode optical fiber, dual-fiber ruggedized connectors, and LED sources and PIN photodiode detectors. The network voice interface was designed to be compatible with standard T1 transmission channels. Thus, telephone call setup and switching functions were performed outside the network in private automatic branch exchange (PABX) equipment. The overall purpose of the testbed was to demonstrate the feasibility of serving a variety of command, control, and communications ($C^3$) needs within the tactical Army using one type of LAN: a high-speed, integrated communications system that combines voice and data on one network. Modular network concepts (local and backbone), rapid deployment capability with fiber optics, and compatibility among several types of Army stations and other ongoing LAN programs are also being investigated.

In the following sections, a brief overview of the real-time traffic requirements for LANs is provided first. Next, the LAN of the present invention itself is described in detail, including the protocol, voice interface module (VIM), fiber optic components, and network operating system. Finally, network performance measures are given, first from a theoretical perspective and then by actual laboratory measurements.

Real-Time Traffic Requirements for LANs

Sustained throughput—

The term "real-time" actually conveys two important network characteristics: (1) high sustained and uninterrupted throughput, and (2) low temporal latency. Voice, video, and scientific instruments such as synthetic aperture radar (SAR) are examples of real-time stream services that require a constant flow of information bits—but at constant delays that may in fact be quite long (250 ms or more). Maintaining high sustained throughput through a LAN requires deterministic protocols that guarantee a minimum portion of the network bandwidth—even under 100% load. Examples include token ring, token bonus, and Express-Net protocols. In general, statistical protocols such as Ethernet are largely unsuitable unless special precautions are taken to pre-allocate a portion of the network bandwidth.

Low Latency—

Transmission latency is directly a function of the network access delay time—i.e. the time it takes for a packet to pass through the transmitting mode queue plus the time of flight of the packet through the cable media and the amount of the time required to actually send the total number of bits in the packet at the channel signaling rate. Examples of low latency real-time services are most feedback control systems (e.g., robotic arms and guidance systems), parallel processor computer networks, and many human interfaces that require minimum response times for proper tactile/auditory/visual feedback. For voice traffic, roundtrip transmission delays up to 300 ms (e.g. one satellite hop) are acceptable, provided that suitable echo control devices are used.

Synchronous Network Interface—

Most real-time traffic networks use a form of synchronous transmission, i.e., bits enter and exit the network in lockstep since all network nodes use a common clock frequency (derived usually from an idle signal or data). Little or no memory buffering is required. Conversely, if an asynchronous network is used, then each node must re-establish timing via a local clock reference (which also portends clock skew issues) and use more extensive buffering.

Network Architecture

Voice Transmission Strategy—

If we impose the requirement that data will be delivered in discrete packets, then elastic buffers can be added to each input and output interface of the network to queue data for transmission or delivery, respectively. This is the basic approach and manner of operation of the present invention as depicted in FIGS. 4–6. As long as the packet arrival rate is deterministic, then the mean depth of all queues will remain constant. This approach the inventor has termed "double elastic buffering" and can be understood readily by drawing an analogy to a fire bucket brigade between two rain barrels where the input/output barrels are, in turn, being continuously filled/emptied, respectively, by two identical pipes. As long as the net volume of water (bits) that is passed through the system remains constant, then no information will be lost. Many system configurations exist that satisfy this basic boundary condition; for example, again employing the bucket brigade analogy, the buckets may be made larger and passed with less frequency, or the barrels may be made larger to tolerate greater fluctuations in load. In these cases, however, some penalties are incurred. For example, in the former case, the packet granularity increases which, in turn, can increase the likelihood of lost packets under load variations. In the latter instance, however, the penalty paid is greater apparent end-to-end delay through the network, which can result in echo for voice or poor response times in control systems. Generally, the double elastic buffer can be configured to minimize latency or maximally smooth network load variations—but not both. Thus, as depicted in FIG. 4, the continuous voice communication from the telephone 16 is digitized and inserted into a first in first out (FIFO) transmitting elastic buffer 22. The contents of the buffer 22 are removed in packets 24 which are transmitted through the fiber optic bundle 18 to the receiving end where they are inserted into a FIFO receiving elastic buffer 26. The packets 24 can then be removed from the buffer 26 in a continuous stream without gaps therebetween so as to "reconstruct" the original continuous communication.

The size of the buffers 22, 26 is derived from the maximum access period on the network, or in the case of a token ring, the station scan time under 100% load—in this case about 3 ms for a 9-station, 1-km ring with 2 Kbyte packets operating at 80 Mbit/s. If voice I/O rate is 1.544 Mbit/s (T1), then a minimum of 4.5K bits would be required. Additional buffer capacity may be desirable for extra system margin in the event of node I/O congestion.

Figure 18:
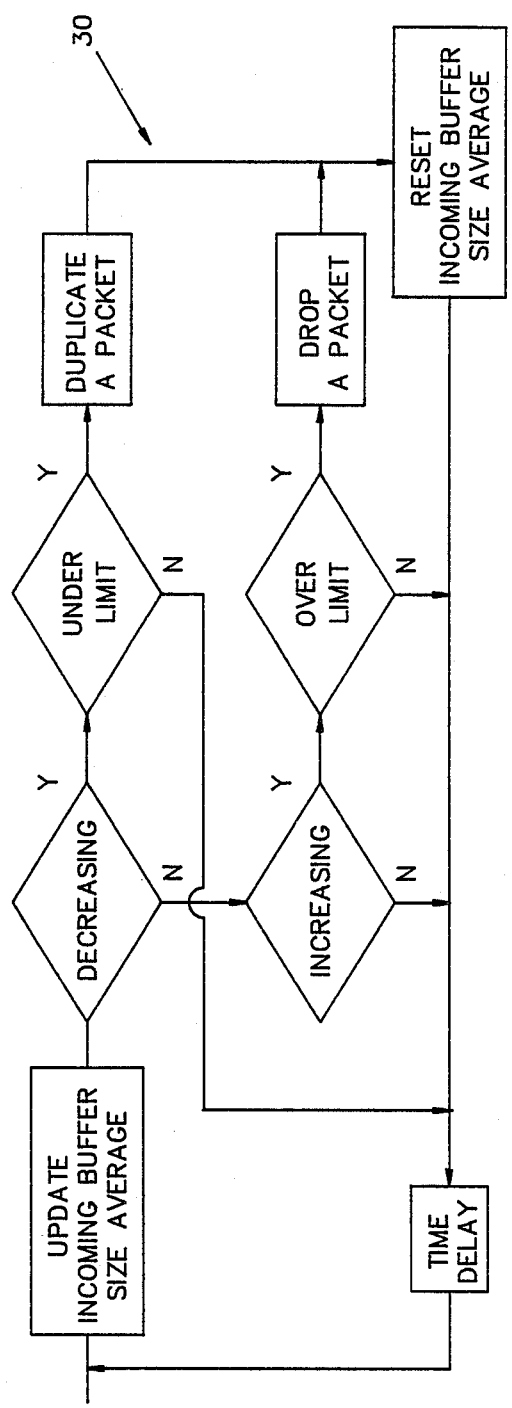
FIG. 18 is a logic flow diagram depicting how the approaches of FIGS. 16 and 17 can be implemented in the buffer control logic of the present invention.
Figure 19:
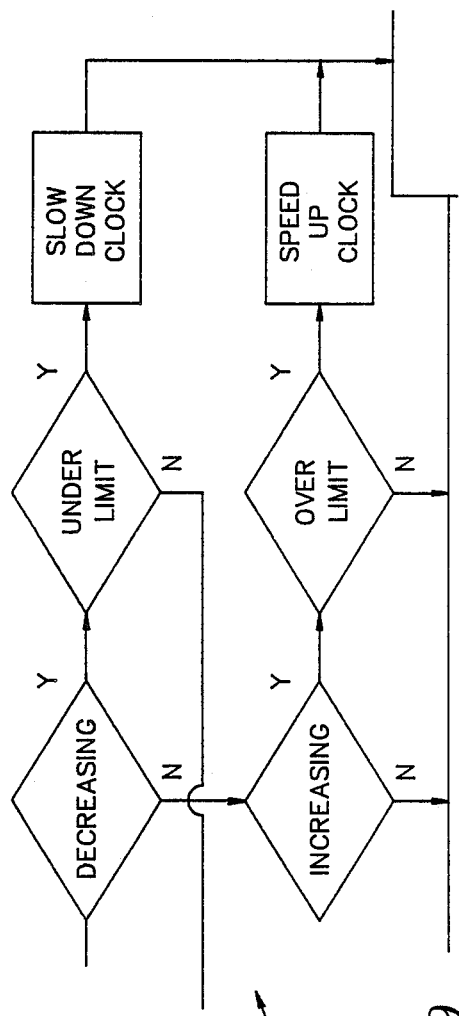
FIG. 19 is a logic flow diagram depicting how the logic of FIG. 18 can be modified in a more sophisticated, and preferred, approach.

Several situations may arise that can disturb the double buffer equilibrium. Most obvious is that the input/output "pipes" may not have exactly the same flow rates, due to, for example, local clock oscillators that may be running at slightly different frequencies. With prior art communications systems such as public telephones employing continuous voice communications, as depicted in FIG. 13, the local clocks 28 are virtually in synchronization. In a network according to the present invention, however, there is a definite probability of a slight difference in frequency of the local clocks 28. With this slight bias, the output barrel (memory) will eventually overflow or empty. As depicted in FIG. 14, the receiving buffer 26 is controlled by buffer control logic 30 which employs a pair of indices for indicating the point on the buffer 26 into which the next packet 24 is to be inserted and from which the next packet 24 is to be removed. By subtracting one of the other, the instantaneous size of the buffer 26 can be determined. If the size is averaged, the ideal situation is the stable state indicated in the graph of FIG. 15; that is, the size is, on the average, constant. It is undesirable for the buffer 26 to be slowly filling; or, for the buffer 26 to be slowly emptying. For oscillator stabilities of 1 part in $10^6$, the drift will be less than 1 us for every 16 minutes of continuous operation. Other disturbances may include lost packets due to collisions or bit errors. Possible system solutions include re-initializing buffers (with a temporary lapse in speech) or using speech interpolation/extrapolation during silent intervals. Other forms of real-time traffic, such as video or control system data, may require other contingency measures. In the tested embodiment of the present invention, the approach of FIGS. 16 and 17 was employed. When a slowly filling state of the buffer 26 was detected, a packet 24 was dropped, i.e. thrown out of the stream. Conversely, when a slowly emptying state of the buffer 26 was detected, a packet 24 was duplicated to add an additional packet to the stream at the receiving end. This, of course, is important since an overflow state would result in the loss of data while an empty state would result in gaps in the reconstructed stream. In tests of voice conversations employing this mode of correction, it was found that either adding or dropping a packet resulted in an almost undetectable "tic" in the communication. Logic which could be employed in the buffer control logic 30 to accomplish this is shown in FIG. 18. Since the flowchart of FIG. 18 should be readily understandable to those skilled in the art, it will not be described in detail herein. An alternate approach as contemplated by the inventor herein is depicted in the partial flowchart of FIG. 19. In this case, instead of duplicating or dropping a packet to compensate for clock differences, means for adjusting the local clock are provided and the clock is actually adjusted to slow it down or speed it up, as appropriate.

Testbed Topology—

Figure 8:
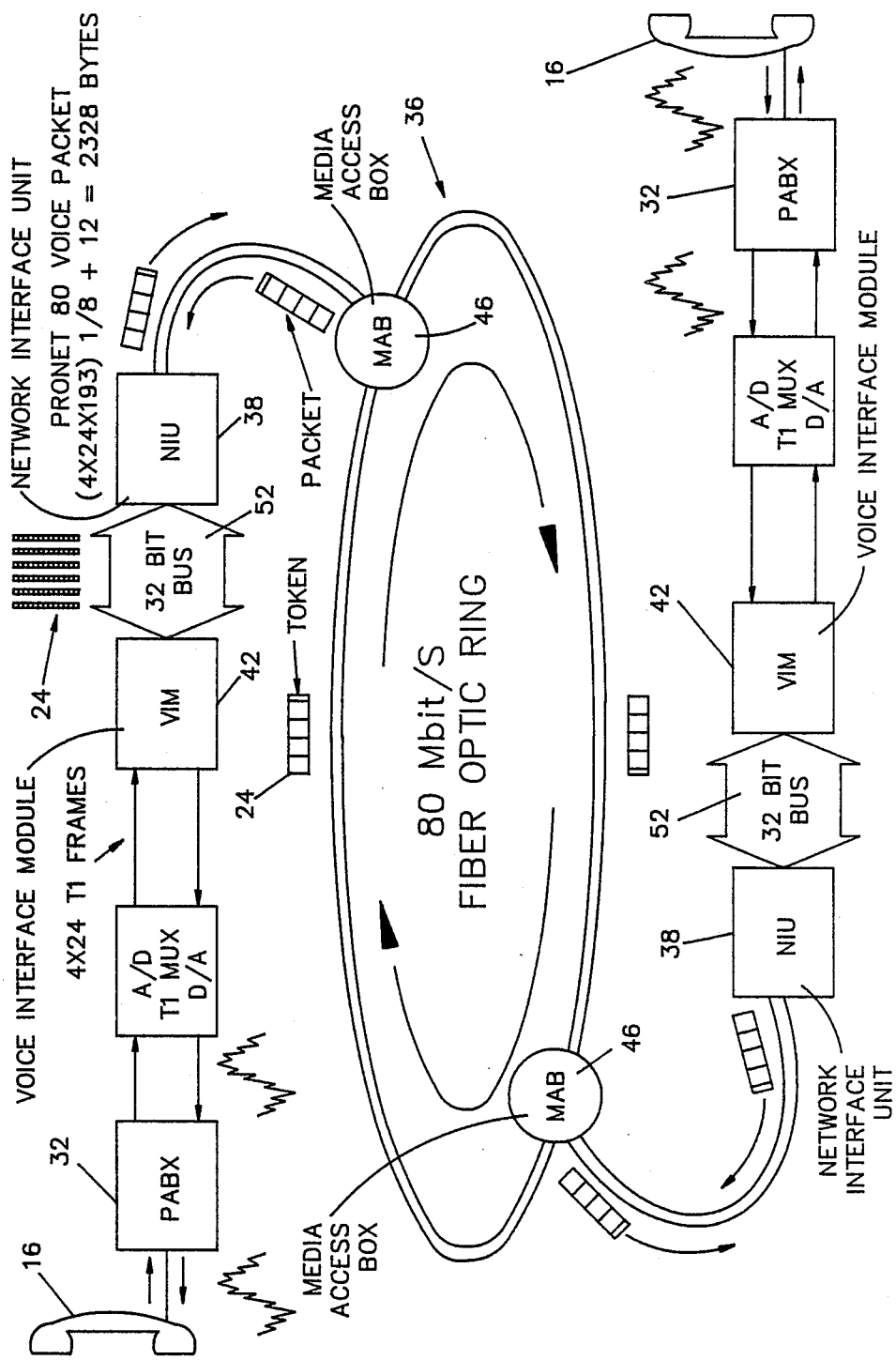
FIG. 8 is a block diagram depicting the manner of voice data flow through the network according to the present invention.

Turning to FIGS. 7 and 8, in the testbed employed by the inventor herein, the computers 10, PABXs 32, and gateway station 40 in the network are connected in a dual-counter-rotating ring topology 36 operating at 80 Mbit/s. Six network interface units 38 (NIUs) were configured into the testbed initially. The three computers 10 each comprise a 68020-based work station having an NIU 38 integrated into the computer's VME backplane. The PABXs 32 T1 interface to the network through a voice interface module 42 (VIM) that contains an NIU 38 and double elastic buffers (i.e. 22, 26) as described earlier. Although the data and voice NIUs 38 are identical, they are logically set up so that each only talks to like units. The packet size for voice is fixed at 2316 bytes while for data it may be variable from 0–4092 bytes. The unidirectional co-ax ring topology is extended to an optical fiber dual-counter-rotating ring 44 topology by means of a media access box (MAB) 46. As will be described further later, in addition to fiber optic transceivers, each MAB 46 includes an 8-port wire center and a microprocessor controller to probe the continuity of each ring and maximally configure the network. A 68010-based gateway 40 provides backbone service to lower speed (<20 Mbit/s) sub-nets, such as IEEE 802.3 and IEEE 802.5. All fiber optic components are based on 1.3-um technology. The fibers between each pair of stations are packaged in one militarized cable with equally ruggedized dual-fiber connectors. The single exception is one link in the ring that maintains full-duplex operation by multiplexing both ring directions into one fiber using wavelength division multiplexing at 0.8-um and 1.3-um. Further descriptions of each component follows.

Network Interface Unit (NIU)—

Each NIU 38 consists of two printed circuit boards: a control board (CTL) and a host specific board (HSB). The access to the token ring for transmission is controlled by a two-byte token in a manner well known and understood in the art. At the minimum, a free token circulates continuously around the ring. If the HSB has received a message from its host for transmission, the CTL then waits for the first "idle" token, changes it to "busy", and then appends the message to it, inserting the source address automatically. When the packet's target address matches with a node's address, that CTL notifies the associated HSB and copies the message into a buffer on the HSB. The transmitting station takes its own message off the ring when it receives it back. A new free token is not generated until the transmitting station has received its own busy token. Hence, there can never be more than one token on the ring and the access to transmit progresses sequentially around the ring. Data bit stuffing is used to guarantee a unique packet header.

The CTL board implements the network data regeneration, address recognition, serial-to-parallel conversion, token management, bit stuffing and error timeout. The CTL has two FIFO (First In First Out) packet buffers that guarantee that simultaneous back-to-back packets can be received without loss of a packet.

The HSB manages all the communication processing such as buffering, sequencing and controlling. This gives the host a low software overhead. The HSB has packet buffers, direct memory access (DMA) logic and a transmitting (4K bytes) and receiving (16K bytes) buffer. The maximum packet size is 4K bytes. The VME interface allows the host to gather or scatter operation, and it also makes possible transmission of multiple packets without intervention.

The time delay that a message experiences between two nodes is divided into two parts. First, there is the propagation delay of the transmitting medium—about 5 usec/km for fiber optics. Second, is the station latency at each node, typically 50 bits. The sum of the station latencies plus the sum of the propagation delays is called the ring latency. Each node in the network has an eight-bit address, which is divided into two four-bit spaces. From the first four bits, sixteen groups can be addressed and from the next four, fifteen users within each group can be selected. The token of each message is preceded by a variable idle period. Hence, both the clock and synchronization is carried along with the message. Each node's transmitter, therefore, is only required to keep bit phase synchronization relative to the next node's receiver. The receiver ignores the message during the idle period and resynchronizes itself when it receives the token. The receiver and transmitter at each node have independent clocks. Thus, jitter is limited to that which develops between consecutive nodes. If there is a drift of more than half a bit from the previous node, the next node adds or drops a bit. The cost of this scheme is a two-byte overhead per packet. A 4-into-6-bit block code is used to combine clock with data—making the effective signal rate on the fiber 120 Mbit/s. This scheme reduces the bandwidth compared to Manchester coding and it is still balanced over every six bits. Parity checking is used to isolate bad symbols and notify the originator.

Voice Interface Module (VIM)—

Hardware:

The voice interface module (VIM) 42 implements in physical hardware the rain barrel analogy described above and the simplified methodology of FIGS. 4–6. The overall process of sending voice over a high-speed (80-Mbit/s) packet-oriented, token-driven, fiber optic local area network represented a design challenge, because the isochronous nature of voice data had to be matched to the asynchronous nature of the packet data. This meant that blocks of digital samples (u255 or "A" law) had to be accumulated and dispatched rapidly enough to maintain an average pool of data in reservoir sufficient to supply the real time demand at the receiving site or node.

Figure 9:
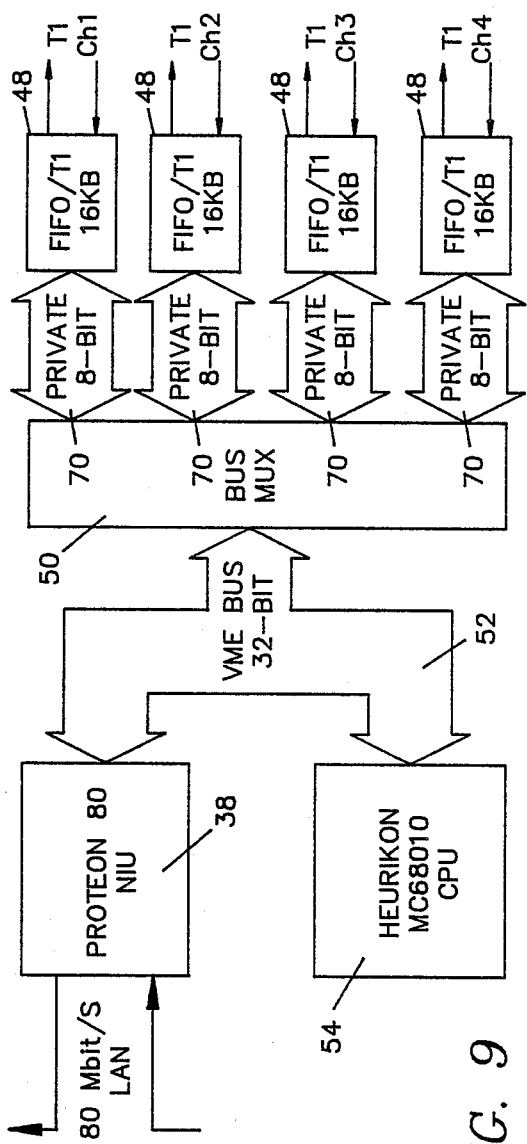
FIG. 9 is a functional block diagram of the voice interface module (VIM) of the present invention.
Figure 11:
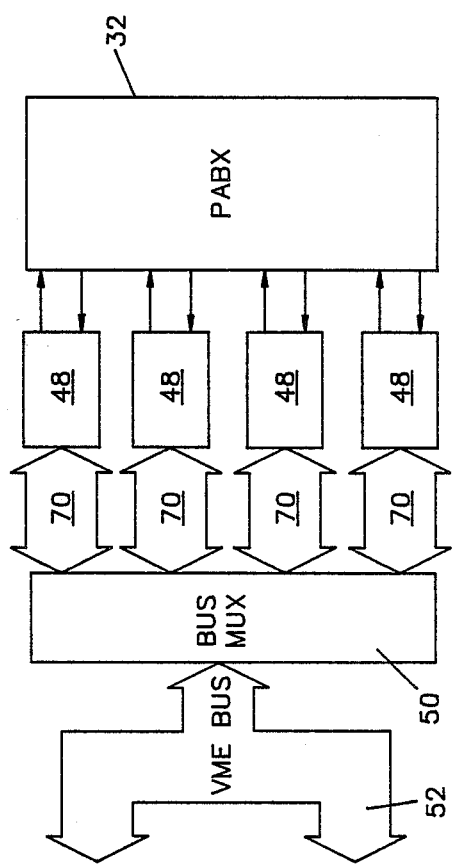
FIG. 11 is the functional block diagram of FIG. 9 showing one manner of hooking up the VIM to a single PABX unit.
Figure 12:
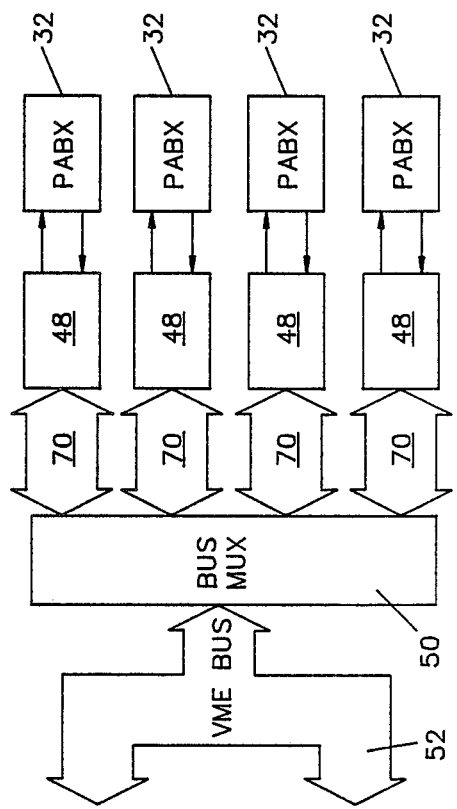
FIG. 12 is the functional block diagram of FIG. 9 showing an alternate manner of hooking up the VIM to a plurality of PABX units to offer different capabilities.

Architecture:

With reference to the block diagram of FIG. 9, partitioning of the design into two natural sections permitted the hardware to be distributed over two custom built cards, one interfacing to the digital T1 stream, and the other to the packet VME bus over which DMA packet transactions are conducted. The former card is conveniently named the FIFO/T1 card 48, while the latter is known as the Bus/Mux card 50. Both cards 48, 50 are bi-directional to support a telephone conversation. The Bus/Mux card's function is to provide the interface between the 32-bit VME bus 52 and the 8-bit storage reservoirs or elastic buffers (FIFOs), i.e. buffers 22, 26 located on the FIFO/T1 cards 48. To do this, a controller, i.e. CPU 54, was custom built to orchestrate the data flow and latching over private buses 70 between the 32-bit DMA transaction requests and the 8-bit FIFOs using three different modes of operation and a maximum of four different nodes or channels. For voice, the data field was set to exactly 2316 eight-bit bytes—which is less than the 4092-byte maximum permitted by the NIU. This construction provides for one of the flexibility features of the present invention as depicted in FIGS. 11 and 12. As shown in FIG. 11 a single PABX 32 can be connected to all the FIFO/T1 cards 48 if that arrangement will provide the most flexibility for the application; or, a plurality of PABXs 32 can be connected to respective ones of the FIFO/T1 cards 48 (or groups thereof) if that arrangement will provide the most flexibility.

Voice Channel Grouping:

For u255, this equates to four sets of T1 super frames; each super frame consists of 24 T1 frames, each 193 bits long. The 193-bit frame is divided up into one framing bit and 24 8-bit time slots of u255 voice data. A packet thus consists of 12 ms of voice data that can be interpreted in several ways relative to u255/A laws and the three software selectable modes.

Figure 20:
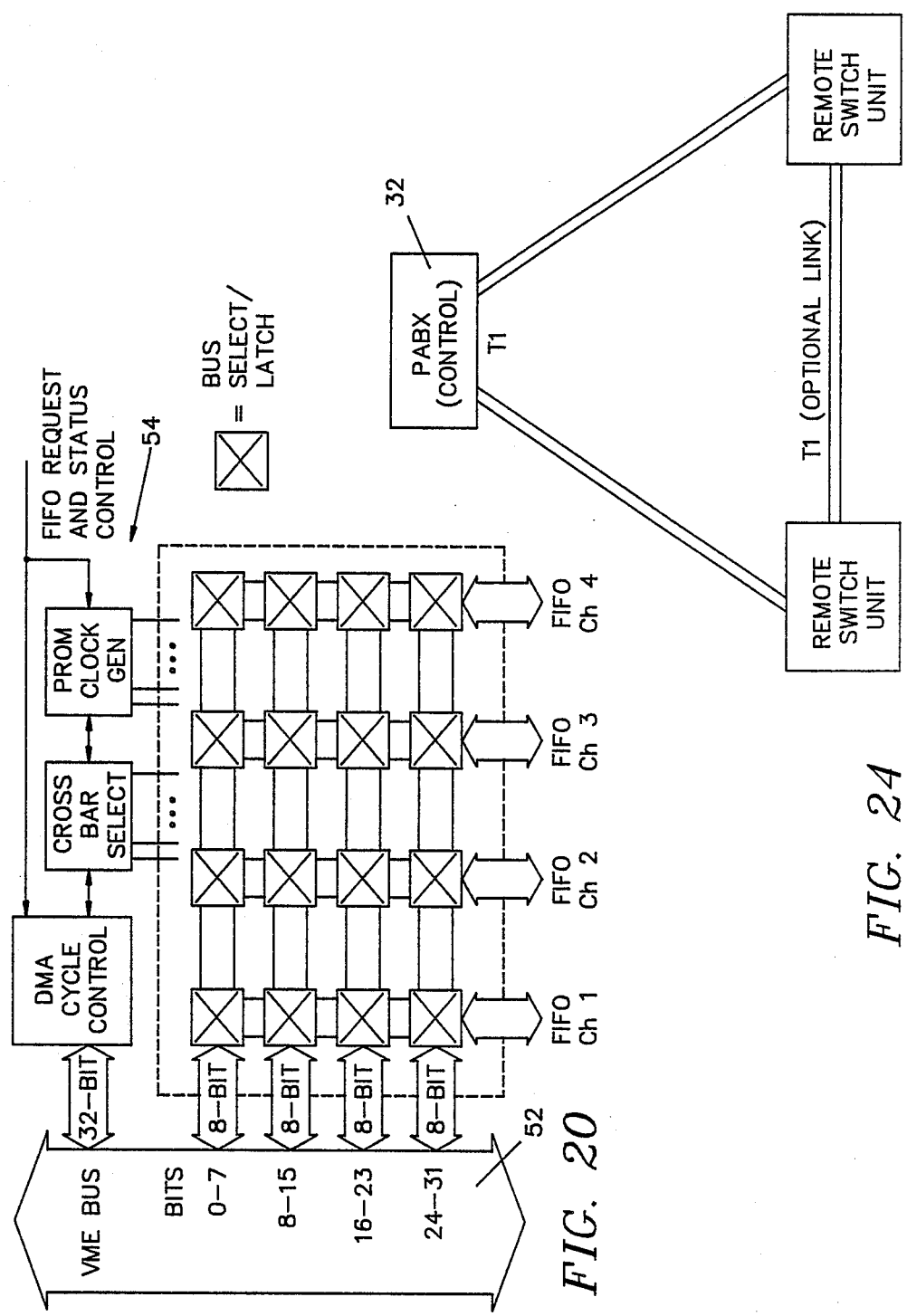
FIG. 20 is a functional block diagram of the voice interface module (VIM) of the present invention.

Bus Multiplexer:

The software selects the mode, node, and law in a control register write instruction, and then sends this 4-byte header with the packet to the remote end. To implement this controller, two programmable logic arrays were designed to map bi-directionally four FIFO pairs (Tx or Rx) to the four bytes (32 bit) of VME data bus via a four-by-four crossbar array of latchable tri-state bus transceivers. In addition, NIU and FIFO real-time interrupt logic resides in one of the logic cell arrays (LCAs) to be discussed shortly. The actual Bus/Mux hardware architecture is shown in FIG. 20. It consists of the following hardware elements:

(a) DMA Cycle Controller and VME Bus Interface. This block performs VME bus address decoding and memory read/write timing control, as well as T1/FIFO status flag monitoring and FIFO read/write control. A 1200-gate programmable logic cell array (LCA) provides the following functions: (i) VME bus interrupt, interface and timing control; (ii) FIFO size control; (iii) DMA state/cycle control; and (iv) FIFO read/write request handshaking.

(b) Crossbar Bus Selector. The functions of the crossbar bus selector (implemented by an LCA) are to provide on-off control of the 16 transceiver array at proper timing according to the mode, node and DMA state/cycle, and to communicate the status of FIFO channels usage to the LCA enabling it to generate a proper FIFO request.

(c) Transceiver Array and DMA Read Latch PROM. This block consists of a 16 transceiver array for mapping the 8-bit FIFO bus to/from the 32-bit VME bus. Up to four transceivers are used in one bus transaction. The crossbar selector sets up the transceivers for the proper data path. The four bipolar PROMs are used for directing the correct DMA and FIFO clock signals to the right enabled transceiver, and hence perform the actual latching operation.

(d) FIFO/T1 Interface. The First In First Out (FIFO) memories act as elastic buffers to interface the asynchronous LAN to the T1 voice data traffic. There is currently one transmit FIFO, one receive FIFO, and T1 conversion circuitry on each FIFO/T1 card. Each of these FIFOs has an input and an output port.

The T1 circuitry receives bipolar voice data from a Private Automatic Branch Exchange (PABX), converts it into a binary data stream and sends it to the input side of the receiver FIFO. Simultaneously, the transmit FIFO performs the reverse operation. The transmission rate to/from the T1 side of these FIFOs is 1.544 Mbit/s and is derived from the T1 receive data stream. Once the card is powered up, T1 data must be continuously received and transmitted for normal operation.

The 8-bit digital interface side of the FIFO/T1 card is connected to the Bus/Mux card through the VME-P2 private bus and a special jumper ribbon cable. Most signal lines are routed to the Bus/Mux card where all of the bus timing and memory decoding for the VIM is performed. Here, two parallel interface chips manage bus transactions to the VME backplane.

Figure 21:
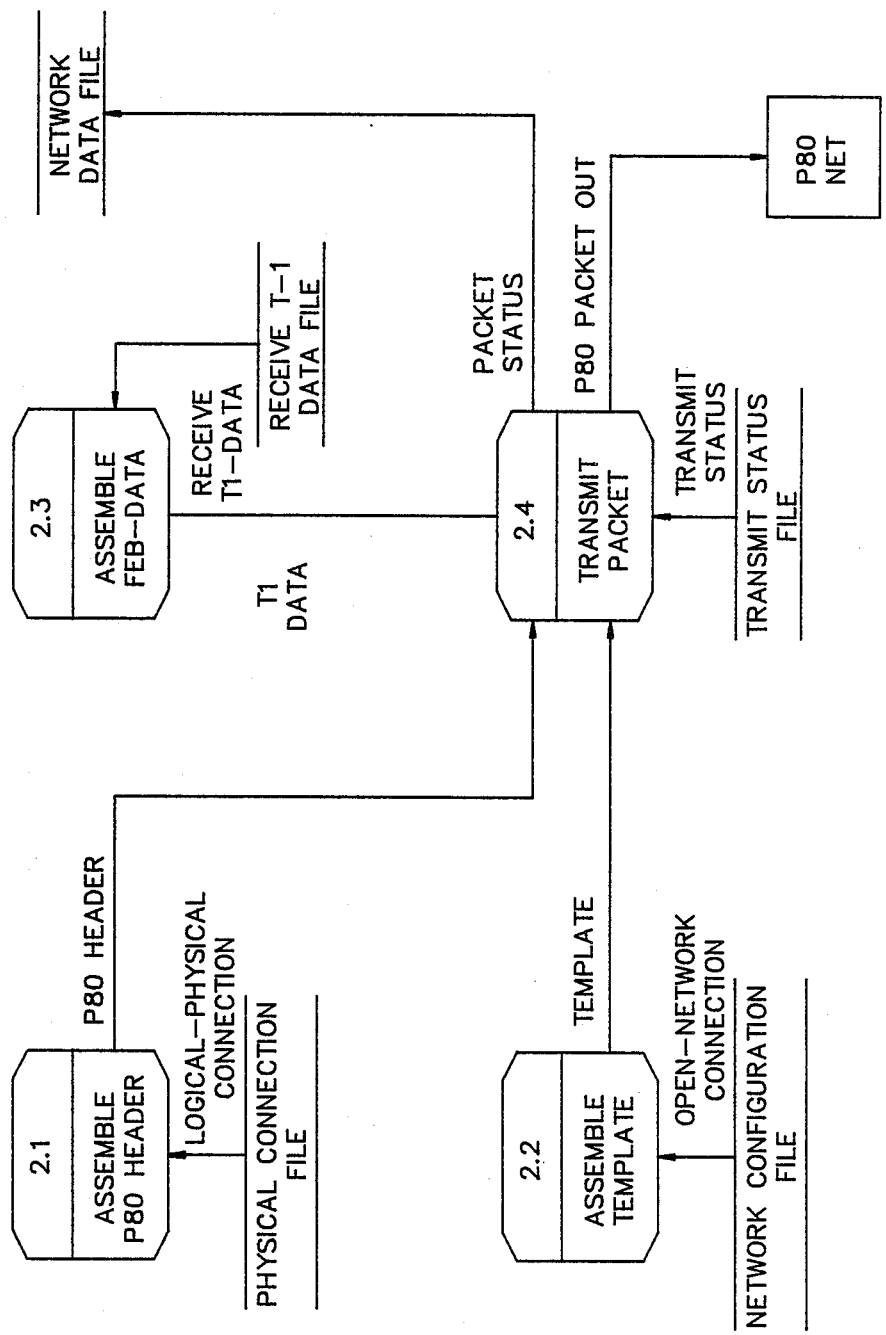
FIG. 21 is a diagram of VIM transmit control flow for an 80 Mbit/s NIU.

Operating System Software:

(a) Voice. The VIM software design assumes packets contain either voice or data (data may be VIM control or status information only), processing of voice packets is given highest priority, transmission of voice packets is given next highest priority, and a NIU may be designated as data-only (e.g. a SUN workstation), or data-voice (VIM). These assumptions require that the NIU transmit interrupt service routine (ISR) must always have priority over the receive ISR, processing of voice packets will occur inside of the relevant ISR, and processing of data packets will occur outside of any ISR. The transmit algorithm depicted in FIG. 21 is as follows: (i) assemble NIU header for specified destination node, (ii) assemble FOTLAN header for specified packet type, (iii) write packet to transmit buffer, (iv) transmit packet, and (v) log transmission processing results.

Figure 22:
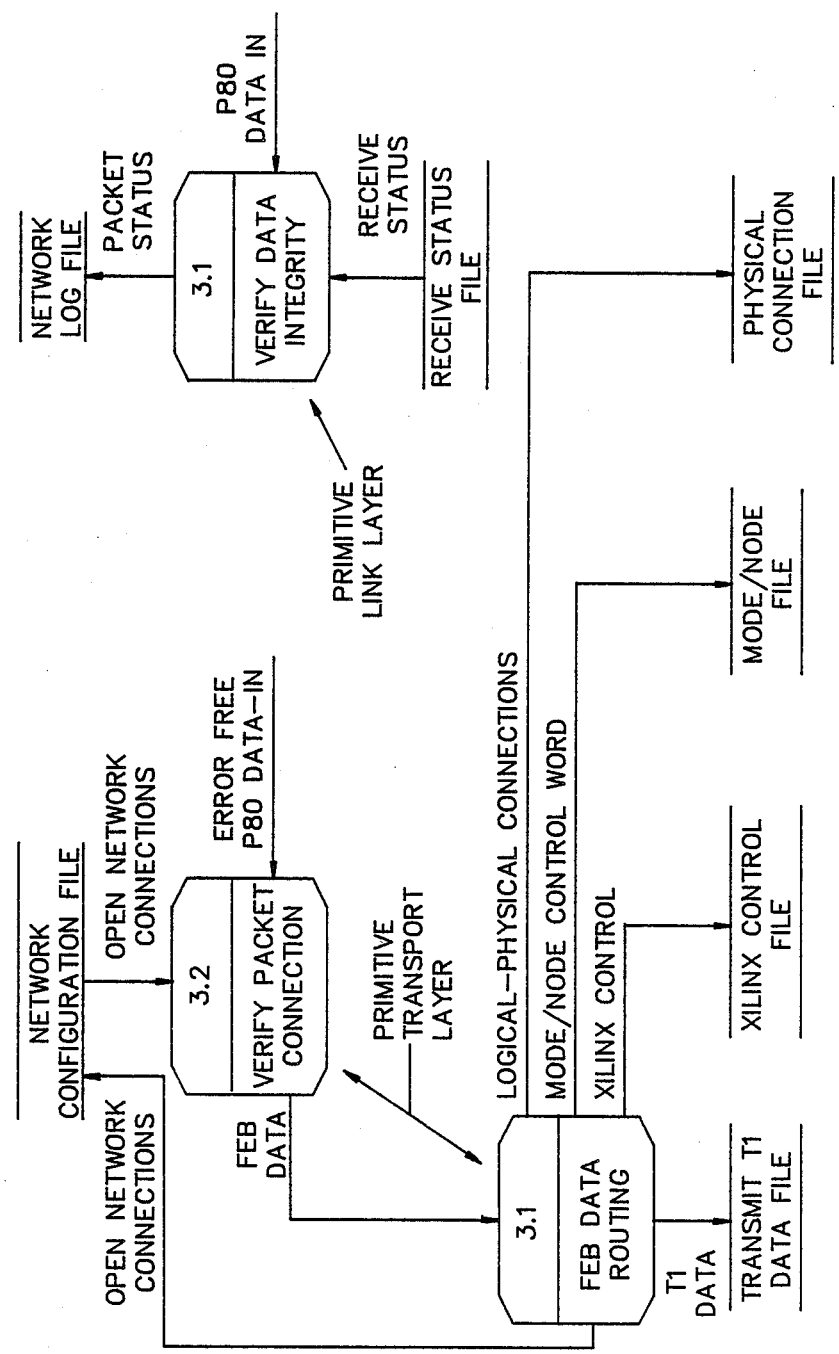
FIG. 22 is a diagram of VIM receive control flow for an 80 Mbit/s NIU.

The receive algorithm (shown in FIG. 22) is: (i) verify integrity of packet received, (ii) verify channel connection, i.e., voice packet from data-voice node, (iii) route voice to voice-processing hardware or queue data for non-ISR processing, and (iv) log reception processing results.

(b) Network Monitor, Diagnostics, and Boot. The VIM bootstrap conforms with the recommendations of ARPA Internet RFC 906. The protocol is actually a simplified version of the client paradigm of TFTP. The address resolution protocol takes advantage of the fact that host physical addresses range in value from 0 to 255. The internet address is constructed by concatenating the network the VIM belongs to and this physical address. Subsequently, a generic file name is, in effect, broadcast to the network. Any TFTP server (daemon) can respond to such request. Once a "connection" is established, the bootstrap will only listen to that particular host until the whole file is transferred or an error occurs. The bootstrap also has the capability of listening for a directive command which allows it to change its target hosts or its generic file name. This capability allows the VIM 42 to load itself from remote servers.

The VIM monitor is essentially a low priority background process. It uses the UDP protocol to communicate with the controlling host. The monitor gathers VIM information that will be used by the controlling host to determine performance, reliability, loading and general system state. It is also the responsibility of the monitor to execute commands on behalf of the controlling host(s) which can change the operating characteristics of the VIM. All commands to the VIM are actually shell scripts which are easily modifiable. All VIM status is optionally logged by the controlling host(s).

Fiber Optics:

The fiber optic portion of the testbed consists of the Media Access Boxes and the dual optical fiber counterclockwise rotating ring network, of which one link is a single fiber bi-directional channel. The performance requirements of the network were a maximum transmission distance of two kilometers at a data rate of 125 Mbit/s, having a BER of less than $10^{-9}$.

Media Access Box (MAB):

The MABs 46 convert the digital data streams arriving from the VIMs 42 and computers (workstations) 10 into optical signals to be transmitted over optical fibers. Each MAB 46 includes a wire center 56, a fiber optic interface 58 and two dual-fiber fiber optic bulkhead connectors 60 as shown in FIG. 23. The wire center 56 is an eight-port device that connects electrically up to seven NIUs using twin shielded twisted pair cables. These may be VIMs, computer hosts, or gateways. The eighth port connects the wire center 56 to the fiber optic ring. The wire center passes signals from one node to the next. If a port is unused, the cable breaks, or a host computer is powered down, the port is bypassed by a relay in the wire center. The fiber optic interface 58 attaches the wire center 56 to the fiber optic counter-rotating ring network through four fibers, two transmitting and two receiving. The heart of each fiber optic interface 58 is a one-chip microprocessor 62, which provides all of the fault tolerance and switching features.

When first powered on, the microprocessor 62 asserts a signaling carrier onto its fiber optic transmitters 64, and begins monitoring the signal quality outputs of its fiber optic receivers 66. In the first phase, the four paths that directly interface to each unit are tested. Each unit tries to handshake with its adjacent units, by probing with the transmitters 64 and acknowledging messages received. If a probe is received, the receiver 66 is declared good and an acknowledge is sent. If an acknowledge is received, the transmitter 64 is declared good. In the second phase of operation, the global connections are tested. Each unit tries to determine if there is a complete loop available on either the primary or secondary path. After this phase, each unit knows which of the paths are available and sets the indicator leads accordingly. If the primary and secondary loops are both non-operational, the network enters the wrap mode, which makes the most of the available interconnections, decomposing the network into two or more fully functional but disconnected networks. If both optical transmitters 64 or receivers 66 are inoperable, a unit has no way of forming a duplex link with other ring members, and will enter loopback mode.

The fiber optic transceivers, i.e. 64, 66, are hybrid modules, packaged in 24-pin DIP carriers and designed for direct printed circuit board mounting. The transmitter 64 thereof utilizes an edge emitting InGaAsP LED having a rise/fall time of 2 ns. The optical output power is −22 dBm, at a wavelength of 1310 nm with a spectral width of 150 nm (FWHM). The receiver 66 utilizes an InGaAs PIN photodiode, and has a sensitivity of −32 dBm and a NEP of −42 Bm. The transceivers operate at data rates of 120 Mbit/s NRZ, using differential emitter coupled logic (ECL). They also possess an integral fiber optic mini-BNC connector, which in turn are connected to the dual-fiber bulkhead connectors 60 that link the MAB 46 to the ring network.

Dual Fiber Optic Network:

Since the testbed was developed primarily to prove the present invention's applicability to a military field environment, the fiber optic link connecting the MABs 46 consists of a ruggedized two-fiber tactical fiber optic cable containing two tightly buffered 50/125-um multimode optical fibers. The cables are terminated with hermaphroditic biconic connectors, which facilitate field deployment and retrieval without physical or optical degradation. The fibers are radiation hard and fully militarized and designed to withstand the stringent environmental and mechanical needs of a tactical field environment. Their attenuation is 3.5 dB/km at 850 nm and 1.0 dB/km at 1300 nm; and, their bandwidth at 1300 nm is greater than 400 MHz-km. The optical fibers are cabled in a ruggedized all-dielectric structure, embedded in Kevlar yarns and surrounded by reinforcing elements and an outer jacket. The cable's outside diameter is 6 mm, and its weight is 30 kg/km. A transmission distance of 3 km is estimated.

Single Optical Fiber, Dual-Channel Link:

In order to further decrease the complexity and cost of the fiber optic network, wavelength division multiplexing (WDM) was used in order to combine two counter-rotating network channels onto one single fiber. One of the transceiver pairs of the fiber optic interface has been replaced with modules, operating at 850 nm. The WDMs employ a dichroic filter, having 50/125-um fiber pigtails and terminated with biconic connectors.

The WDMs, various connectors, and increased fiber attenuation at 820 nm (3.5 dB/km), introduce additional losses in the network thereby reducing the overall power budget—and the maximum MAB/MAB separation distance. A single fiber length of about 0.5 km is estimated. Longer ranges could be achieved by replacing the LED modules with more powerful laser diode transmitters.

Peripherals:

1. Computer Workstations

The testbed includes three computer workstations 10 and two personal computers (PCs) 68. These act as a source and sink of data traffic, provide a platform to develop VIM software, perform gateway functions between the 80 Mbit/s token ring and IEEE 802.3 and 802.5 subnets, and act as a network monitor and controller for the VIM modules. The workstations each possess a 68020 processor operating at 16.7 MHz, 4 Mbyte RAM, 140 MB disk storage, and a built-in 802.3 interface. The operating system is a partially converged version of BSD 4.2 and AT&T System V UNIX, and includes utilities for implementing network file system access.

2. PABX

Three Private Automatic Branch Exchange (PABX) telephone switches are configured into the testbed. The triad T1 connection topology for the PABXs 32 is shown in FIG. 24. Each PABX 32 possesses two T1 ports—one to each of the other two switches. When the packet network and VIMs are inserted in these three T1 links, the logical T1 connection topology remains the same although the voice is now exchanged in the form of packets as depicted in FIG. 25.

The fully-digital PABX system is built on a nonblocking distributed architecture, and is capable of handling 240 simultaneous voice and data traffic channels over standard two-pair telephone wire. A 1 m$^3$ module houses the 16-bit 8086 main processor, disc drives, RAM, power supply, and interface units (IUs).

Performance

Theory—

Longer time delays allow the LAN protocol more time to reschedule queued packets for transmission, thus more effectively utilizing the available network bandwidth. Also, note that findings of the testing conducted on the testbed indicate that the throughput begins to roll-off as a function of distance as the ring propagation length approaches the temporal length of a packet. The overall loss in throughput from 0.1 to 10 km is approximately 5 Mbit/s, which is a very small percentage when operation is in the 60-70 Mbit/s region. At a high load, i.e., above 50 Mbit/s, the change in throughput for a change in distance from 0.1 to 10 km is less than 10%

Measurements—

1. Workstation/LAN Throughput

Throughput was measured using two types of protocols: User Datagram Protocol (UDP) and Transmission Control Protocol/Internet Protocol (TCP/IP). Both were implemented on 68020 workstations. UDP is considerably more efficient but does not perform flow control, acknowledgments, and error checking. For most tests, the input data was truncated to 1 Kbyte boundaries to prevent fragmented packets from being transmitted and lowering efficiency. The test software generated long blocks of random data in RAM and directly output this to the network, bypassing the disk subsystem. At the receiving workstation, the same data was discarded on a byte-by-byte basis.

Figure 10:
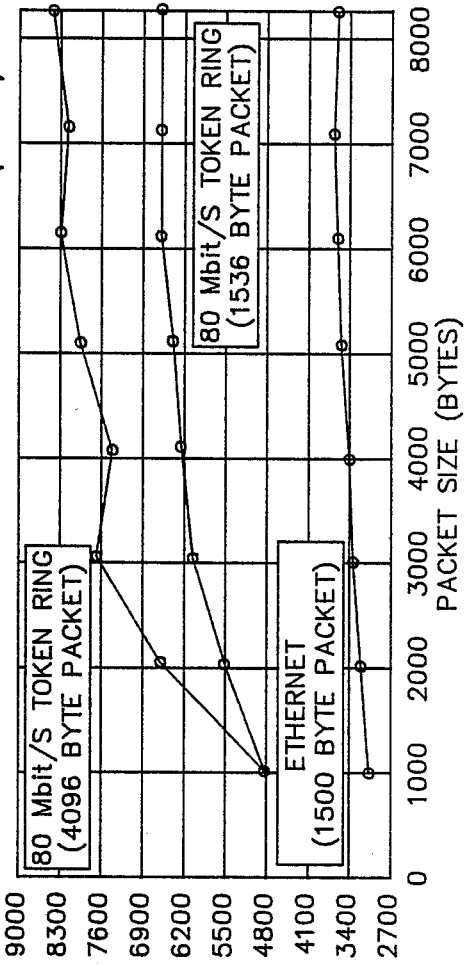
FIG. 10 is a graph showing throughput vs. packet size in a network according to the present invention.

Using a TCP/IP protocol and 1K byte alignment, the throughput between two Sun workstations was measured to be 2.2 Mbit/s for the 80 Mbit/s LAN and 1.8 Mbit/s for Ethernet. No other workstations or voice traffic are on the network. In this case, the 80 Mbit/s LAN performs about 20% better than Ethernet. The difference, however, is so small that minor variations in the way that the software I/O drivers are written probably play a more important role than the actual speed of each network. Additional overhead data at the higher TCP/IP levels evidently plays a major role in restricting the overall throughput. This picture becomes clearer in the graph of FIG. 10 where the simpler UDP protocol is used. Here, for similar 1500-byte message lengths, the 80 Mbit/s token ring provides nearly double the throughput of the Ethernet. For 4096-byte message lengths, this figure triples. Still, however, the throughput is much less than expected from theory. This limitation is probably a result of the UNIX I/O driver for the NIU using a programmed I/O rather than DMA interface. Other overhead may be contributed by the operating system and UDP.

2. Gateway/Backbone Throughput

The Sun workstations can also be used as gateways between the 80 Mbit/s token ring and Ethernet, thereby permitting backbone topologies to be configured. In these tests, two separate Ethernet sub-nets were set up, each with two Sun workstations. One workstation from each group acted as a gateway. The remaining workstations acted as a packet source and sink, respectively. For the TCP/IP protocol, only a slight degradation in the Ethernet throughput was perceived (<5%) by routing traffic over the 80 Mbit/s backbone. For UDP, no difference was seen. One would conclude from these measurements that virtually no degradation is incurred by routing Ethernet traffic over a backbone.

3. Voice Tests

Bit error rate (BER) tests were performed at the T1 interface of two VIM units attached to the ring. Less than 4 errors in 1012 transmitted bits were recorded over a 48-hour period. Error injection tests indicate that BERs on the order of $10^{-4}$ were not discernible. FIFO re-initialization due to clock skew bias was barely perceptible but occurred at long intervals (−1 hr). Elastic buffer delays up to 12 ms can be configured with the current VIM hardware. The longer delays resulted in noticeable (but not obtrusive) echo, and agrees with earlier findings.

I claim:

1. In a communications network for transmitting packets of information between nodes attached to a common communications path, the improvement for permitting a plurality of nodes to transmit and recieve voice, video, and other forms of real-time traffic between one another over one local area network comprising:

a plurality of interfacing units operably connecting respective ones of the nodes to the communications path, each interfacing unit comprising, (a) transmitter means for transmitting onto the communications path;

(b) receiver means for removing transmissions from the communications path;

(c) a non-fixed length, expandable, elastic FIFO transmitting buffer connected to receive continuous real-time transmissions from its associated node;

(d) a non-fixed length, expandable, elastic FIFO receiving buffer connected to receive transmissions from said receiver means;

(e) transmitting logic means for removing said real-time transmissions from said transmitting buffer, for dividing said real-time transmissions into a sequence of packets, and for using said transmitter means to transmit said packets onto the communications path; and, (f) receiving logic means for receiving said packets from said receiver means, for storing said packets into said receiving buffer, and for removing said packets from said receiving buffer and transmitting them to the associated node in contiguous form to reconstruct said real-time transmissions.

2. The improvement to a communications network of claim 1 wherein:

(a) said communications path is a token passing ring wherein a token bit sequence is transmitted along a ring communications path to indicate the point where a packet can be placed onto the ring;

(b) said transmitting logic includes logic to precede each said token bit sequence with an idle period of non-transmission; and, (c) said receiving logic includes logic to sense said idle period and use the bits of said token bit sequence to establish and synchronize to the clock of the packet following thereafter whereby clock information relative to the packets is conveyed across boundaries of the network.

3. The improvement to a communications network of claim 1 wherein:

said receiving logic means includes compensating means for monitoring the average size of said receiving buffer, for slowing the filling of said receiving buffer when said average size is increasing, and for increasing the filling of said receiving buffer when said average size is decreasing whereby said average size is maintained in a stable state and said receiving buffer is prevented from being totally emptied or from overflowing.

4. The improvement to a communications network of claim 3 wherein:

said compensating means includes means for dropping a said packet to slow the filling of said receiving buffer and for duplicating a said packet to increase the filling of said receiving buffer.

5. The improvement to a communications network of claim 3 wherein:

(a) said receiving logic means is driven by an adjustable frequency clock; and, (b) said compensating means includes means for slowing said clock to slow the filling of said receiving buffer and for speeding up said clock to increase the filling of said receiving buffer.

6. The improvement to a communications network of claim 1 wherein each of said interfacing units includes a voice interface module comprising:

(a) network interface unit means for interfacing with the communications path through said transmitter means and said receiver means;

(b) M-bit VME bus means for conducting M bits of data in parallel between an input and an output thereof, said output being connected to an input of said network interface means;

(c) bi-directional Bus/Mux means for receiving N bits of data in parallel at respective ones of a plurality of inputs thereof, where M is an integer multiple of N, and for transmitting the resulting M parallel bits of said data to an output thereof connected to said input of said VNE bus means;

(d) a plurality of bi-directional N-bit private bus means for conducting N bits of data in parallel between inputs and outputs thereof, said outputs being connected to respective ones of said inputs of said Bus/Mux means;

(e) a plurality of bi-directional FIFO/T1 means each including said elastic FIFO transmitting and receiving buffers for receiving real-time communications traffic at inputs thereof into said transmitting buffer thereof, for outputting reconstructed real-time communications, traffic from said transmitting buffer at outputs thereof, and for interfacing with respective ones of said private bus means through N-bit input/output interfaces connected to respective ones of said inputs of said private bus means; and, (f) controller means operably connected for controlling data flow over said VME bus means between said Bus/Mux means and said network interface unit means.

7. A local area communications network for permitting a plurality of nodes to transmit and receive voice, video, and other forms of real-time traffic between one another comprising:

(a) a communications medium disposed along a path between the nodes;

(b) a plurality of interfacing units operably connecting respective ones of the nodes to said communications medium, each interfacing unit comprising, (b1) transmitter means for transmitting onto said communications medium;

(b2) receiver means for removing transmissions from said communications medium;

(b3) a non-fixed length, expandable, elastic FIFO transmitting buffer connected to receive continuous real-time transmissions from is associated node;

(b4) a non-fixed length, expandable, elastic FIFO receiving buffer connected to receive transmissions from said receiver means;

(b5) transmitting logic means for removing said real-time transmissions from said transmitting buffer, for dividing said real-time transmissions into a sequence of packets, and for using said transmitter means to transmit said packets onto said communications medium; and, (b6) receiving logic means for receiving said packets from said receiver means, for storing said packets into said receiving buffer, and for removing said packets form said receiving buffer and transmitting them to the associated node in contiguous form to reconstruct said real-time transmissions.

8. The communications network of claim 7 wherein:

(a) said communications medium is a token passing ring wherein a token bit sequence is transmitted along a ring communications medium to indicate the point where a packet can be placed onto the ring;

(b) said transmitting logic includes logic to precede each said token bit sequence with an idle period of non-transmission; and, (c) said receiving logic includes logic to sense said idle period and use the bits of said token bit sequence to establish and synchronize to the clock of the packet following thereafter whereby clock information relative to the packets is conveyed across boundaries of the network.

9. The communications network of claim 7 wherein:

said receiving logic means includes compensating means for monitoring the average size of said receiving buffer, for slowing the filling of said receiving buffer when said average size is increasing, and for increasing the filling of said receiving buffer when said average size is decreasing whereby said average size is maintained in a stable state and said receiving buffer is prevented from being totally emptied or from overflowing.

10. The communications network of claim 9 wherein: said compensating means includes means for dropping a said packet to slow the filling of said receiving buffer and for duplicating a said packet to increase the filling of said receiving buffer.

11. The communications network of claim 9 wherein:
(a) said receiving logic means is driven by an adjustable frequency clock; and,
(b) said compensating means includes means for slowing said clock to slow the filling of said receiving buffer and for speeding up said clock to increase the filling of said receiving buffer.

12. The communications network of claim 7 wherein each of said interfacing units includes a voice interface module comprising:
(a) network interface unit means for interfacing with said communications medium through said transmitter means and said receiver means;
(b) M-bit VME bus means for conducting M bits of data in parallel between an input and an output thereof, said output being connected to an input of said network interface means;
(c) bi-directional Bus/Mux means for receiving N bits of data in parallel at respective ones of a plurality of inputs thereof, where M is an integer multiple of N, and for transmitting the resulting M parallel bits of said data to an output thereof connected to said input of said VNE bus means;
(d) a plurality of bi-directional N-bit private bus means for conducting N bits of data in parallel between inputs and outputs thereof, said outputs being connected to respective ones of said inputs of said Bus/Mux means;
(e) a plurality of bi-directional FIFO/T1 means each including said elastic FIFO transmitting and receiving buffers for receiving real-time communications traffic at inputs thereof into said transmitting buffer thereof, for outputting reconstructed real-time communications traffic from said transmitting buffer at outputs thereof, and for interfacing with respective ones of said private bus means through N/bit input/output interfaces connected to respective ones of said inputs of said private bus means; and,
(f) controller means operably connected for controlling data flow over said VME bus means between said Bus/Mux means and said network interface unit means.

13. The method of operating a local area communications network to permit a plurality of nodes to transmit and receive voice, video, and other forms of real-time traffic between one another comprising the steps of:
(a) disposing a communications medium along a path between the nodes;
(b) employing a plurality of interfacing units to operably connect respective ones of the nodes to the communications medium;
(c) inputting real-time communications traffic from a transmitting node into a non-fixed length, expandable, elastic FIFO transmitting buffer;
(d) removing stored traffic from the transmitting buffer in fixed length packets and transmitting the packets sequentially onto the communications medium;
(e) inputting the packets sequentially from the communications medium into a non-fixed length, expandable, elastic FIFO receiving buffer at a receiving node; and,
(f) removing the packets from the receiving buffer and transmitting them to the associated receiving node in contiguous form to reconstruct the original real-time transmission.

14. The method of claim 13 wherein the communications medium is a token passing ring where a token bit sequence is transmitted along a ring communications medium to indicate the point where a packet can be placed onto the ring and additionally including the steps of:
(a) at each transmitting node, preceeding each token bit sequence with an idle period of non-transmission; and,
(b) at each receiving node, sensing the idle period and using the bits of the token bit sequence to establish and synchronize to the clock of the packet following thereafter whereby clock information relative to the packets is conveyed across boundaries of the network.

15. The method of claim 13 and additionally including the steps of:
(a) monitoring the average size of the receiving buffer;
(b) slowing the filling of the receiving buffer when the average size is increasing; and,
(c) increasing the filling of the receiving buffer when the average size is decreasing whereby the average size is maintained in a stable state and the receiving buffer is prevented from being totally emptied or from overflowing.

16. The method of claim 15 wherein:
(a) said step of slowing the filling of the receiving buffer when the average size is increasing comprises dropping a packet to slow the filling of the receiving buffer; and,
(b) said step of increasing the filling of the receiving buffer when the average size is decreasing comprises duplicating a packet to increase the filling of the receiving buffer.

17. The method of claim 15 and additionally comprising the step of:
(a) employing an adjustable frequency clock in said step of removing the packets from the receiving buffer and transmitting them to the associated receiving node in contiguous form to reconstruct the original real-time transmission; and wherein,
(b) said step of slowing the filling of the receiving buffer when the average size is increasing comprises slowing the clock to slow the filling of the receiving buffer; and,
(c) said step of increasing the filling of the receiving buffer when the average size is decreasing comprises speeding up the clock to increase the filling of the receiving buffer.

* * * * *